United States Patent
Wong et al.

(10) Patent No.: US 10,879,987 B2
(45) Date of Patent: Dec. 29, 2020

(54) COMMUNICATIONS DEVICES, INFRASTRUCTURE EQUIPMENT AND METHODS

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/475,693

(22) PCT Filed: Dec. 5, 2017

(86) PCT No.: PCT/EP2017/081502
§ 371 (c)(1),
(2) Date: Jul. 3, 2019

(87) PCT Pub. No.: WO2018/127340
PCT Pub. Date: Jul. 12, 2018

(65) Prior Publication Data
US 2019/0379440 A1 Dec. 12, 2019

(30) Foreign Application Priority Data
Jan. 5, 2017 (EP) .................................... 17150485

(51) Int. Cl.
*H04B 7/06* (2006.01)
*H01Q 25/00* (2006.01)
(Continued)

(52) U.S. Cl.
CPC ......... *H04B 7/0695* (2013.01); *H01Q 25/002* (2013.01); *H04B 7/0408* (2013.01);
(Continued)

(58) Field of Classification Search
CPC .. H01Q 25/002; H04B 7/0404; H04B 7/0408; H04B 7/0617; H04B 7/0695;
(Continued)

(56) References Cited

U.S. PATENT DOCUMENTS

2009/0175161 A1 7/2009 Yi et al.
2014/0016573 A1 1/2014 Nuggehalli et al.
(Continued)

OTHER PUBLICATIONS

International Search Report and Written Opinion dated Feb. 1, 2018 for PCT/EP2017/081502 filed on Dec. 5, 2017, 14 pages.
(Continued)

*Primary Examiner* — Jaime M Holliday
(74) *Attorney, Agent, or Firm* — Xsensus, LLP

(57) ABSTRACT

A communications device comprises controller circuitry configured in combination transmitter and receiver circuitry to form one or more beams to transmit data, each of the beams having a different angular bias with respect to a location of the communications device, to transmit the signals, using a first of the beams, to change, dependent on one or more sets of predetermined conditions being met, a beam width of the first of the beams, and to re-transmit the signals using the first of the beams having the changed beam width.

20 Claims, 9 Drawing Sheets

(51) Int. Cl.
  *H04B 7/0408* (2017.01)
  *H04W 16/28* (2009.01)
  *H04W 72/04* (2009.01)
  *H04B 7/0404* (2017.01)

(52) U.S. Cl.
  CPC .......... *H04B 7/0617* (2013.01); *H04W 16/28* (2013.01); *H04W 72/046* (2013.01); *H04B 7/0404* (2013.01); *Y02D 30/70* (2020.08)

(58) Field of Classification Search
  CPC .... H04W 16/28; H04W 72/046; Y02D 70/10; Y02D 70/12; Y02D 70/1242; Y02D 70/1262; Y02D 70/21; Y02D 70/444
  See application file for complete search history.

(56) References Cited

U.S. PATENT DOCUMENTS

| | | | | |
|---|---|---|---|---|
| 2014/0177607 A1* | 6/2014 | Li | ........................ | H04B 7/0695 370/336 |
| 2014/0376466 A1* | 12/2014 | Jeong | ................ | H04W 74/0833 370/329 |
| 2015/0215077 A1 | 7/2015 | Ratasuk et al. | | |
| 2016/0066197 A1* | 3/2016 | Park | ...................... | H04W 16/28 370/329 |
| 2017/0237477 A1* | 8/2017 | Fujio | .................... | H04B 7/0408 370/329 |
| 2018/0176948 A1* | 6/2018 | Islam | .................. | H04W 74/008 |
| 2019/0182681 A1* | 6/2019 | Ansari | .................. | H04W 16/28 |
| 2019/0254082 A1* | 8/2019 | Takeda | ................ | H04W 52/367 |

OTHER PUBLICATIONS

Holma et al., "LTE for UMTS OFDMA and SC-FDMA Based Radio Access", Wiley 2009, System Architecture Based on 3GPP SAE, 11 pages.

Qualcomm Incorporated, "New Work Item: NanrowBand IOT (NB-IOT)", 3GPP TSG RAN Meeting No. 69 RP-151621, Phoenix, USA, Sep. 14-16, 2015, 8 page.

Nokia et al., "Support for Beam Based Common Control Plane", 3GPP TSG-RAN WG1 Meeting No. 85 R1-165364, Nanjing, P.R. China, May 23-27, 2016, 5 pages.

Qualcomm Incorporated, "Multi-beam RACH Design and Evaluation", 3GPP TSG RAN WG1 Meeting No. 87 R1-1612031, Reno, NV, U.S.A., Nov. 14-18, 2016, 11 pages.

Samsung, "Preamble design aspects for NR RACH without beam correspondence", 3GPP TSG RAN WG1 Meeting No. 87 R1-1612462, Reno, Nevada, USA, Nov. 14-18, 2016, 5 pages.

NTT Docomo, "New SID Proposal: Study on New Radio Access Technology", 3GPP TSG RAN Meeting No. 71 RP-160671, Göteborg, Sweden, Mar. 7-10, 2016, 8 pages.

* cited by examiner

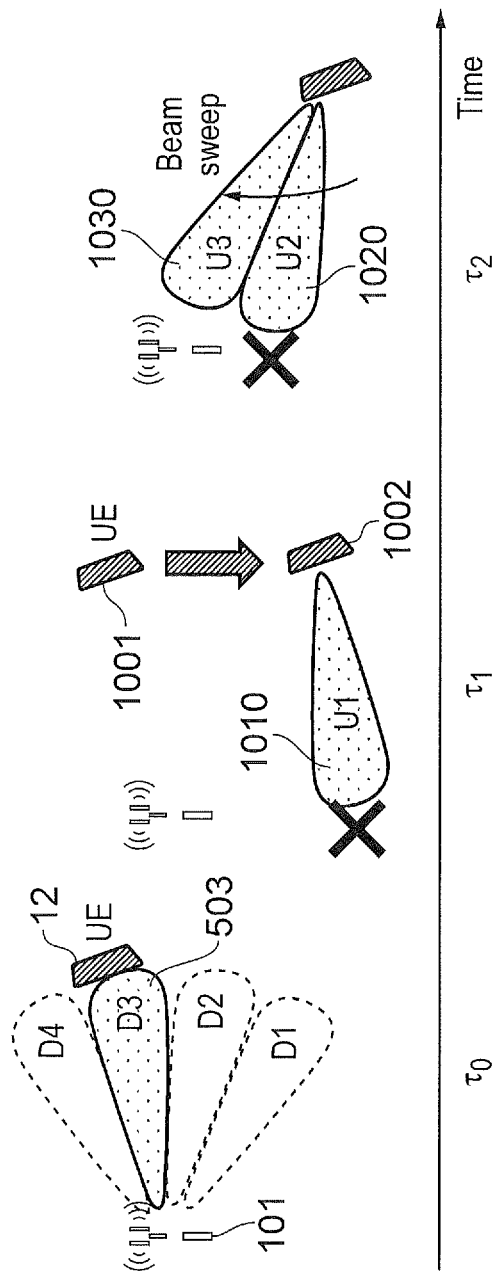
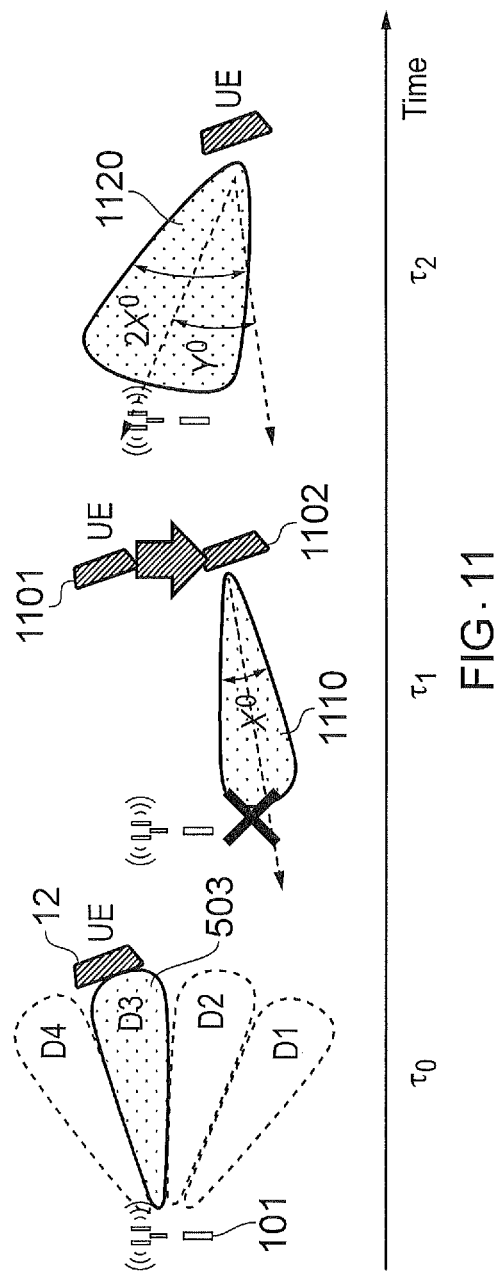
FIG. 10
FIG. 11

COMMUNICATIONS DEVICES, INFRASTRUCTURE EQUIPMENT AND METHODS

CROSS-REFERENCE TO RELATED APPLICATIONS

The present application is based on PCT filing PCT/EP2017/081502, filed Dec. 5, 2017, which claims priority to EP 17150485.5, filed Jan. 5, 2017, the entire contents of each are incorporated herein by reference.

BACKGROUND

Field of Disclosure

The present disclosure relates to communications devices which are configured to receive data transmitted from a wireless communications network, where the communications devices are configured to transmit the data as one or more beams of signals, and corresponding methods of controlling the communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new challenges as well as opportunities. One such opportunity is use beam forming as effectively as possible to communicate data to communications devices. Proposals have been made regarding beam reciprocity and beam sweeping in order to exploit the possibilities of beam forming. However, embodiments of the present technique are able to increase the probability of signal detection at a gNB when transmitting signals over a long distance, whilst saving transmission power at a UE. Such embodiments of the present technique are not known in the prior art.

SUMMARY OF THE DISCLOSURE

The present disclosure can help address or mitigate at least some of the issues discussed above. As such, embodiments of the present technique can provide a communications device for transmitting data to or receiving data from a wireless communications network. The communications device comprises transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data. The controller circuitry is configured in combination with the receiver circuitry and the transmitter circuitry to form one or more beams which can be used by the transmitter circuity to transmit data to one or more of the infrastructure equipment, each of the beams having a different angular bias with respect to a location of the communications device, to transmit the signals, using a first of the beams, to one of the infrastructure equipment, to change, dependent on one or more sets of predetermined conditions being met, a beam width of the first of the beams, and to re-transmit, using the first of the beams having the changed beam width, the signals to the one of the infrastructure equipment.

Embodiments of the present technique can also provide a communications device for transmitting data to or receiving data from a wireless communications network. The communications device comprises transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data. The controller circuitry is configured in combination with the receiver circuitry and the transmitter circuitry to form a plurality of beams which can be used by the transmitter circuity to transmit data to one or more of the infrastructure equipment, each of the beams being offset from one another, to transmit, using a first of the beams, data to one of the infrastructure equipment, and to re-transmit using at least one next beam, dependent on one or more sets of predetermined conditions being met, the data to the one of the infrastructure equipment.

As stated above, the introduction of new radio access technology (RAT) systems/networks therefore gives rise to new challenges as well as opportunities. One such opportunity is use beam forming as effectively as possible to communicate data to communications devices. It is known, for example see 3GPP document "Multi-beam RACH design and evaluation" (Qualcomm Inc.) [1], that PRACH transmissions on the uplink can be made using a beam which is the reciprocal of the beam used on the downlink. It is also known, for example see 3GPP document "Preamble design aspects for NR RACH without beam correspondence" (Samsung) [2], that a beam can be widened by applying differential beamforming. However, embodiments of the present technique, which relate to the widening of a beam in successive PRACH transmission attempts, are not known in the prior art.

Embodiments of the present technique can provide arrangements in which a communications device increases the angular width of beams used to transmit data to wireless communications network, known as beam ramping, in order to increase the likelihood of the data being successfully received. Such embodiments describe various ways in which beam ramping can be exploited by communications devices, in order to save power at such devices whilst still being able to successfully transmit data to infrastructure equipment of a wireless communications network over long distances.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 10 illustrates an example of beam sweeping which excludes previously attempted and failed beams in accordance with embodiments of the present technique;

FIG. 11 illustrates an example of changing beam direction in different PRACH transmission attempts in combination with beam ramping in accordance with embodiments of the present technique;

DETAILED DESCRIPTION OF THE EMBODIMENTS

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [3] to develop a new RAT for the next generation wireless communication system, i.e. 5G, and in 3GPP a Study Item (SI) on NR has been agreed [4] in order to study and develop the new RAT. The new RAT is expected to operate in a large range of frequencies, from hundreds of MHz to 100 GHz and it is expected to cover a broad range of use cases. The use cases that are considered under this SI include:
  Enhanced Mobile Broadband (eMBB)
  Massive Machine Type Communications (mMTC)
  Ultra Reliable & Low Latency Communications (URLLC)

Figure 1:
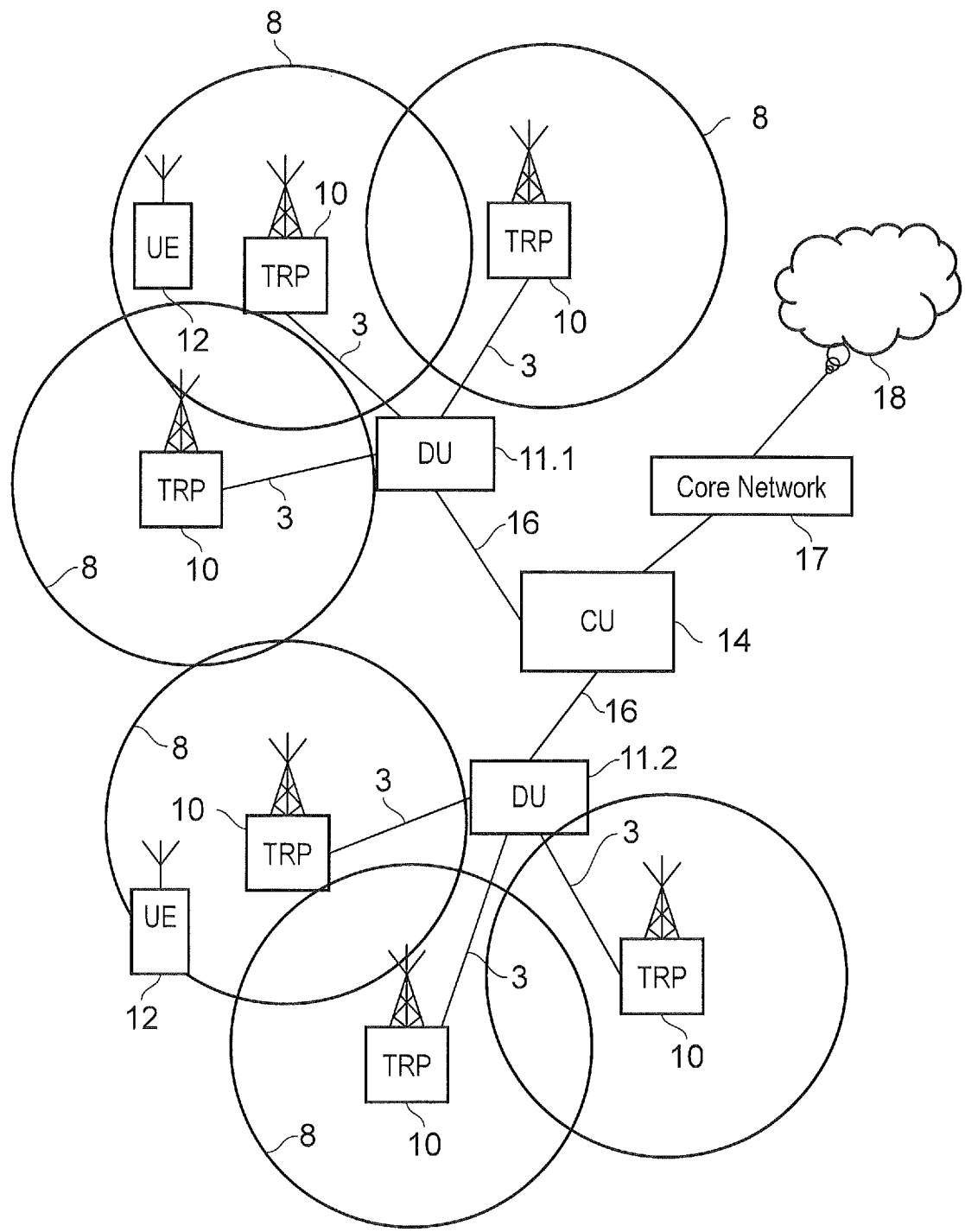
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:
  Low latency
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars)
  Low device cost and energy consumption
  Flexible spectrum usage
  Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a dashed line 8. In other configurations of NR networks, cells may be formed of multiple TRPs, where each is controlled by a DU. As such wireless communications devices 12 which are within a radio communications range provided by the cells 8 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [5]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 12 may have a functionality corresponding to devices known for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Beam Forming in New RAT Systems

Figure 2:
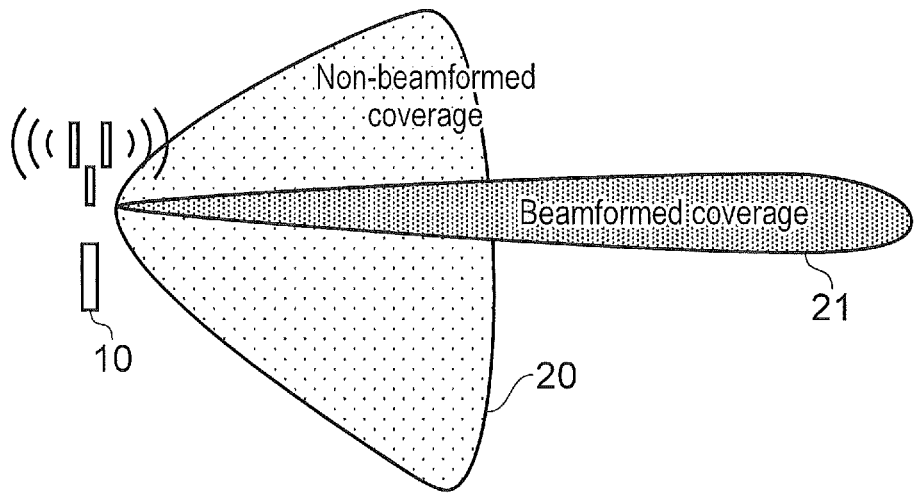
FIG. 2 is a schematic representation illustrating a difference between transmitting signals from a sectorised antenna and signals transmitted as a beam.

Embodiments of the present technique concern an aspect of new radio which is referred to as beam forming. It has been proposed that a wireless communications interface provided to a future wireless communications network may be operating with high frequency carriers such as those within a millimetre waveband, for example with a large carrier frequency range between 20 GHz and 100 GHz to enable a large frequency bandwidth, for example with a few hundred MHz to 1 GHz, to be used offering very high throughput for eMBB services and supporting large capacity. However, operation in such high frequency bands leads to very high propagation loss leading to small coverage areas of a cell radius within a few tens of meters. One way of overcoming a poor coverage area within a millimetre waveband is to beam form the signal. That is, to concentrate the energy of the signal to within a narrow beam, which allows the gNB to reach larger distances. FIG. 2 shows coverage achieved with and without beamforming. A conventional sectorised antenna without beamforming would cover a broad area 20 but with shorter reach whereas using beamforming, the gNB covers a narrow area 21 but reaches larger distances. Since the wavelength of radio waves in the millimetre waveband is small, a large number of antenna elements e.g. 10s to 100s, can be packed into a TRP 10 thereby giving higher flexibility in forming beams (i.e., beams can be very narrow). Accordingly, it is proposed to use beam forming in which radio signals are transmitted from a plurality of antennas which combine coherently in a certain direction and so a signal power within this direction is significantly higher than signal strength in other directions. Such an arrangement is disclosed by a more detailed representation of components shown in in FIG. 3.

Figure 3:
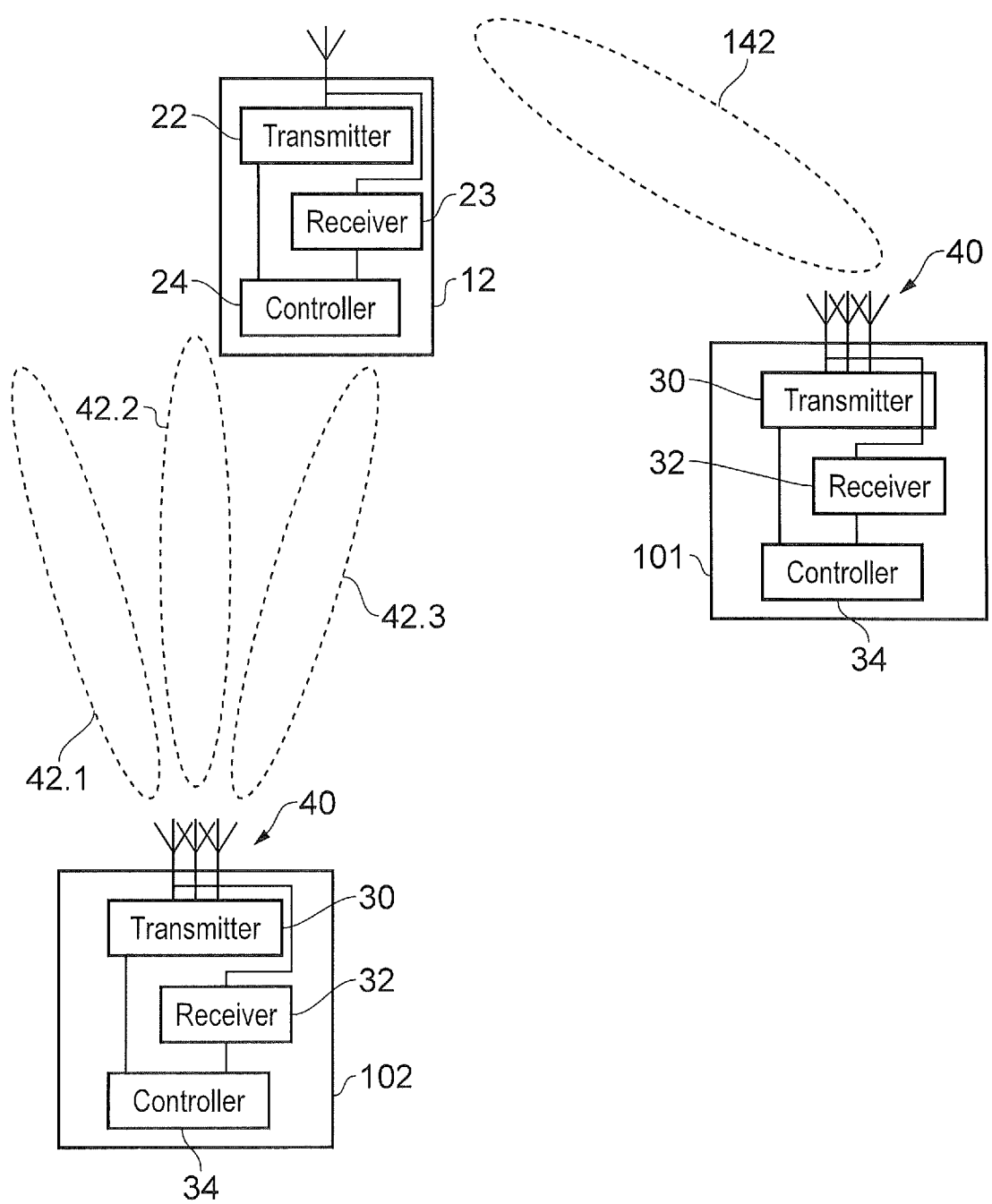
FIG. 3 is a simplified schematic block diagram of radio infrastructure equipment of a wireless communications network shown in FIG. 1 and a communications device illustrating a process of transmitting data as beams of signals.

FIG. 3 provides a representation of a simplified implementation of two of the radio infrastructure equipment or TRP 101, 102 and a communications device or UE 12. As shown in FIG. 3 the communications device 12 includes a transmitter 22, a receiver 23 and a controller 24 which controls the transmitter and the receiver to transmit and receive signals representing data via the wireless access interface to the TRP 101, 102 and from the TRP 101, 102. The TRP correspondingly includes a transmitter 30, a receiver 32 and a controller 34. The transmitter 30 may include analogue and digital circuitry such as radio frequency circuits, analogue amplifiers as well as digital signalling processing software implemented as application specific semiconductor circuits, dedicated signalling processing logic and other processors. Similarly the receiver includes radio frequency circuitry and signal processing software in the form of digital signal processors and other devices for detecting signals. The controller 34 is formed from control circuitry including processors executing software, application specific semiconductor circuits or hardware circuits executing digital logic. In some examples the controller can include a so-called "scheduler" which schedules the transmission of signals and the reception of signals via the wireless access interface. Similarly the transmitter 22 and the receiver 23 of the communications device 12 may include analogue as well as digital components, radio frequency filters and transmitters as well as digital signal processing and software controlled processors. The control circuitry controls the transmitter and receiver using software control processors, application specific semiconductor devices or other digital hardware.

As shown in FIG. 3 each of the TRP 101, 102 includes a plurality of antennas 40. In accordance with the present technique the signals transmitted by each of the antennas 40 may be adapted in phase so that the signals add coherently in a particular direction with the effect that signal strength of the radio signals transmitted in this direction is significantly higher than other directions. Accordingly the antennas in combination with a transmitter 30 can form the radio signals into a plurality of "beams" 42.1, 42.2, 42.3, 142.

Furthermore because of the nature of the transmission of radio signals within a millimetre waveband, the beams 42.1, 42.2, 42.3, 142 may be transmitted to particular communications devices 12 and each of the beams 42.1, 42.2, 42.3, 142 may be identified using some appropriate identifier. In some examples the identifier can be made using reference signals transmitted with the radio signals forming the beam 42. The identifier can additionally be associated with a timing of the transmission of the beams. The radio signals themselves may also include a cell identifier, which identifies the infrastructure equipment or TRP or group of TRPs supporting a cell which transmitted the signals. For this reason the term cell can be used interchangeably with TRP or infrastructure equipment which is operating to provide the cell. As shown in FIG. 3 one of the TRP 101, 102 can transmit a plurality of the beams 42.1, 42.2, 42.3 to the same communications device 12, which can therefore be individually identified. The beams 42.1, 42.2, 42.3 can also be transmitted in a broadcast manner, transmitting information such as synchronisation information, system information etc.

Figure 4:
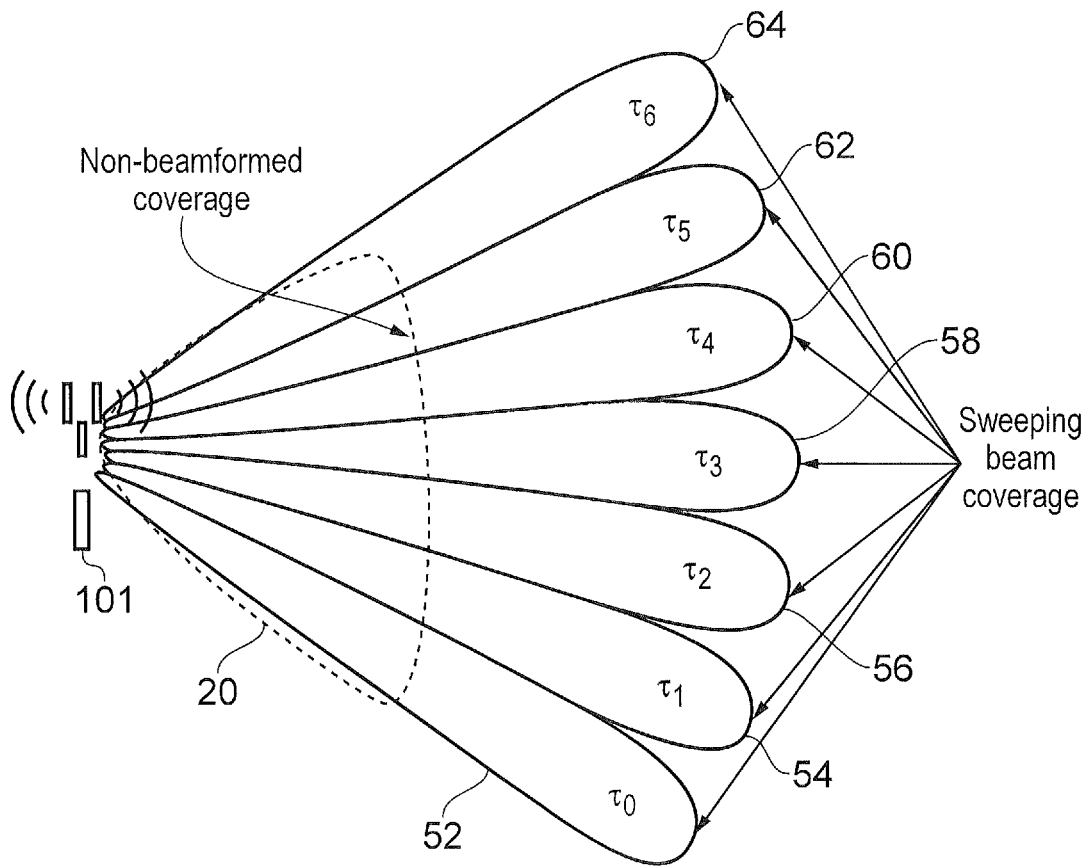
FIG. 4 is a schematic representation illustrating how a beam of signals can be used to transmit data by sweeping the beam through a plurality of different directions.

In conventional networks, beamforming is typically used for UE specific data where the UE feeds back beamforming weights, i.e. pre-coding vectors, to the gNB and the gNB selects a suitable set of precoding weights to form a beam directed towards the UE. This method would only increase the coverage of UE specific data but cannot be used for common channels for common messages such as MIB or SIB. Beam sweeping is proposed in [6] to extend the coverage for common channels, where a beam providing common channels is directed in different angles at different times. An example is shown FIG. 4, where the gNB or TRP 101 directs the beam in the south east direction 52 at time $\tau_0$ and moves the beam in a counter clock wise manner by $X°$ in time until $\tau_1$ and proceeds in this manner for different beam directions 54, 56, 58, 60, 62 until the beam points to the north east direction 64 at time $\tau_6$, after which, the beam sweeping starts again from direction 52. This enables the gNB or TRP 101 to transmit a common channel over a larger area, over a time period, compared to the non-beamformed coverage area 20 as shown in FIG. 2, and also by the dotted area 20 in FIG. 4. It will be appreciated that beam sweeping can also be used for UE specific data where the UE 12 is served by one or more sweeping beams.

Similarly to LTE, in NR the UE accesses the network using a Random Access (RACH) procedure, part of which consists of transmitting a Physical Random Access Channel (PRACH). In a beam sweeping deployment, where a UE is performing beam forming in order to receive signals on the downlink, in order for the UE's PRACH transmission to reach the gNB in the uplink with an equal link gain to signals received by the UE on the downlink, the PRACH needs to be beamformed. The UE therefore needs to find the right beam for PRACH transmission.

Figure 5:
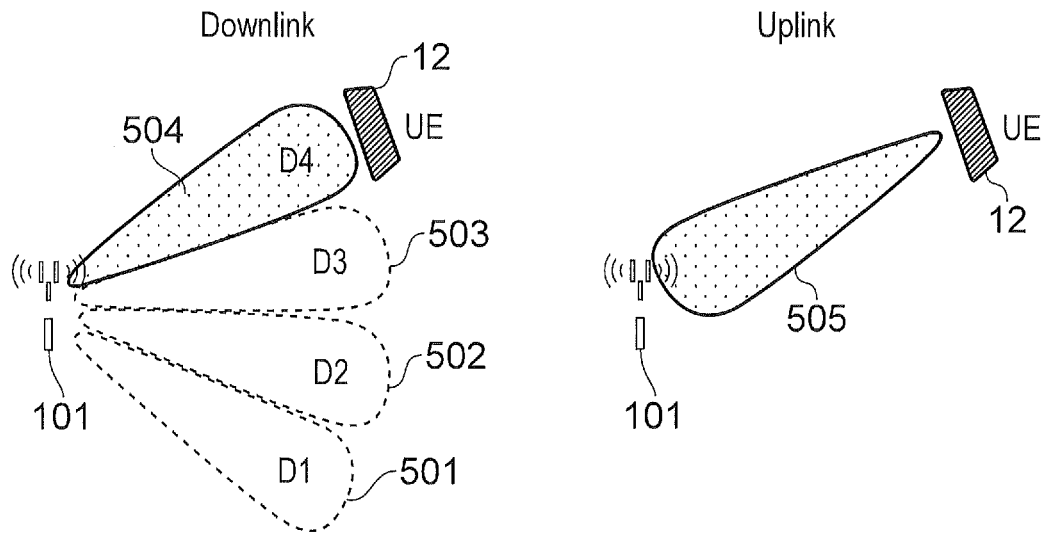
FIG. 5 shows a first example of uplink beamforming based on beam reciprocity.

The concept of beam reciprocity exists. In a beamformed system, both reception and transmission beamforming can be applied. When the best beam to receive a signal is the same as the best beam to transmit a signal, then the system is considered to exhibit the property of beam reciprocity (also termed beam correspondence). Beam reciprocity may not exist for several reasons, which can include lack of calibration between the transmit path and the receive path at the communicating element, or the set of elements used for the transmit path being different to the set of elements used for the receive path. FIG. 5 shows a system where beam reciprocity applies. Here, a TRP can transmit on four beams, D1 501, D2 502, D3 503 and D4 504. A UE 12 has received the common channel from the TRP 101 on beam D4 504 and would then transmit using a reciprocal beam 505 in the uplink.

Figure 6:
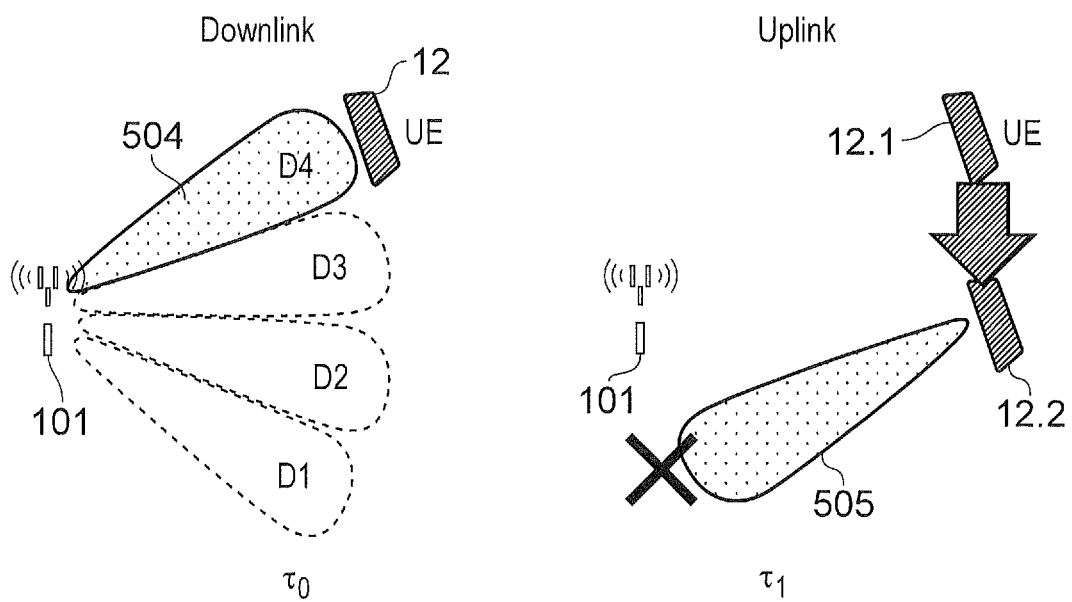
FIG. 6 shows a second example of uplink beamforming based on beam reciprocity, but where a wrong beam is selected in the uplink due to movement of a UE.

It should be appreciated that reciprocity may not give the correct uplink beam since the UE may move or calibration in the transmission and reception paths may change or be different. In addition, the identification by the UE of the best beam in the downlink may be inaccurate when the signal-to-noise ratio (SNR) is low (the accuracy of Reference Signal Received Power (RSRP) measurement decreases as SNR decreases, so there is a greater amount of uncertainty in determining the best downlink beam when the SNR is low, leading to the UE potentially identifying an incorrect beam as the best downlink beam). An example of this is shown in FIG. 6, where in time $\tau_0$, the UE 12 receives its common channel from the gNB 101 using beam D4 504 in the downlink and at time $\tau_1$, the UE 12 transmits the PRACH using the reciprocal beam 505, but the UE 12 has moved from position 12.1 where it received the common channel to position 12.2, and the beam D4 504 is no longer the right beam and the PRACH fails to be detected by the gNB 101.

In LTE, when a PRACH fails, the UE will retransmit the PRACH using higher transmission power. However, if the beam points in the wrong direction, higher transmission power may not be sufficient to reach the gNB (and may cause interferences). Hence, there is a need to manage the retransmission of the PRACH when beam forming is used in the uplink.

Beam Ramping in New RAT Systems

Embodiments of the present technique provide systems and methods which perform beam ramping on the PRACH transmission attempts. In beam ramping, the beam width, which corresponds to an angle of coverage provided by the beam, is changed when the number of PRACH attempts increases.

Figure 7:
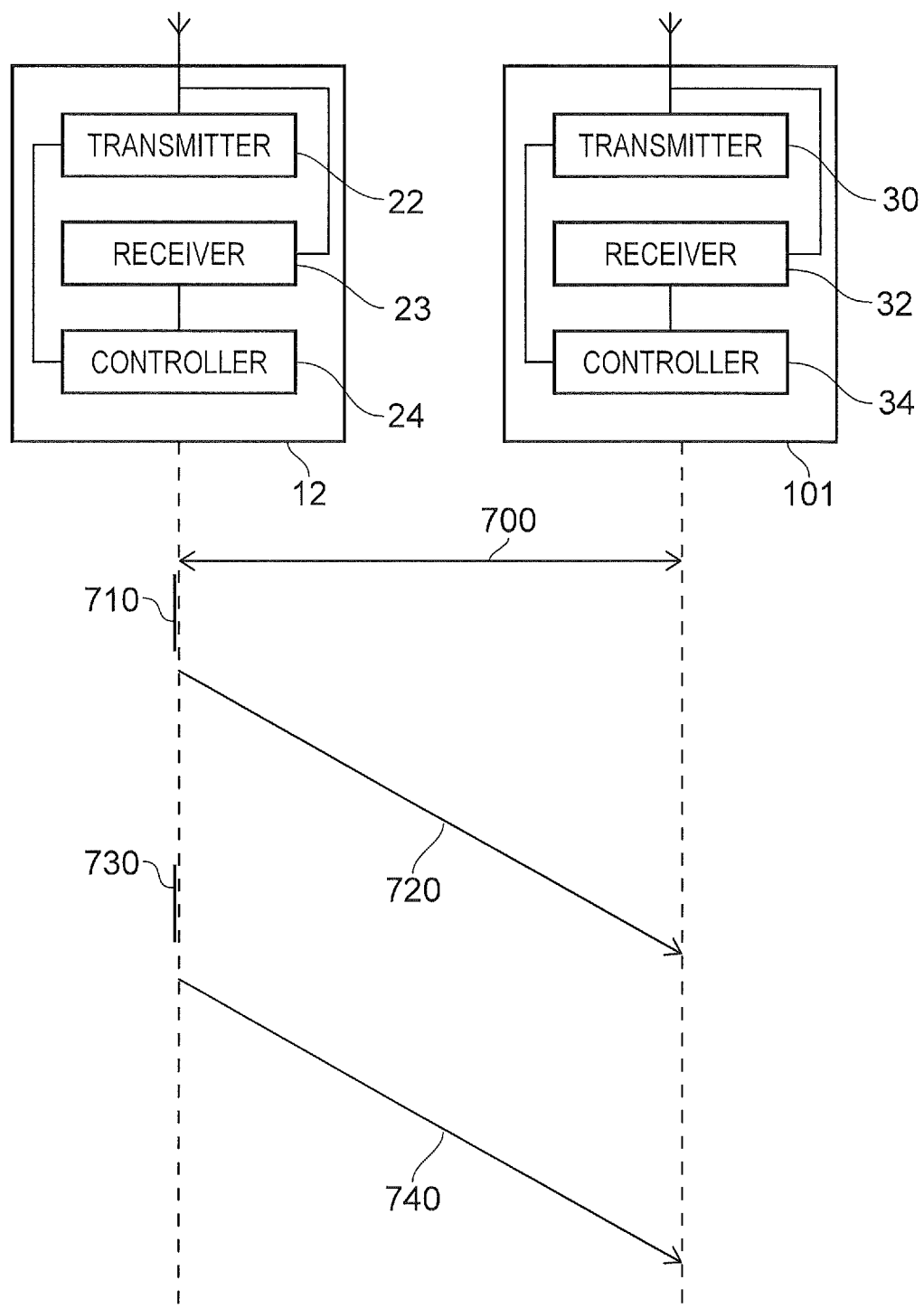
FIG. 7 is a part schematic representation, part message flow diagram of communications between a communications device and an infrastructure equipment in accordance with embodiments of the present technique.

Embodiments of the present technique are related to a communications device 12 for transmitting data to or receiving data from a wireless communications network, as shown in FIG. 7. The communications device 12 comprises transmitter circuitry 22 configured to transmit signals to one or more infrastructure equipment 101, 102 of the wireless communications network via a wireless access interface 700 provided by the one or more infrastructure equipment 101, 102, receiver circuitry 23 configured to receive signals from the one or more infrastructure equipment 101, 102 via the wireless access interface 700, and controller circuitry 24 configured to control the transmitter circuitry 22 and the receiver circuitry 23 to transmit or to receive the signals representing data. The controller circuitry 24 is configured in combination with the receiver circuitry 23 and the transmitter circuitry 22 to form 710 one or more beams which can be used by the transmitter circuitry 22 to transmit data to one or more of the infrastructure equipment 101, 102, each of the beams having a different angular bias with respect to a location of the communications device 12, to transmit 720 the signals, using a first of the beams, to one of the infrastructure equipment 101, to change 730, dependent on one or more sets of predetermined conditions being met, a beam width of the first of the beams, and to re-transmit 740, using the first of the beams having the changed beam width, the signals to the one of the infrastructure equipment 101.

Figure 8:
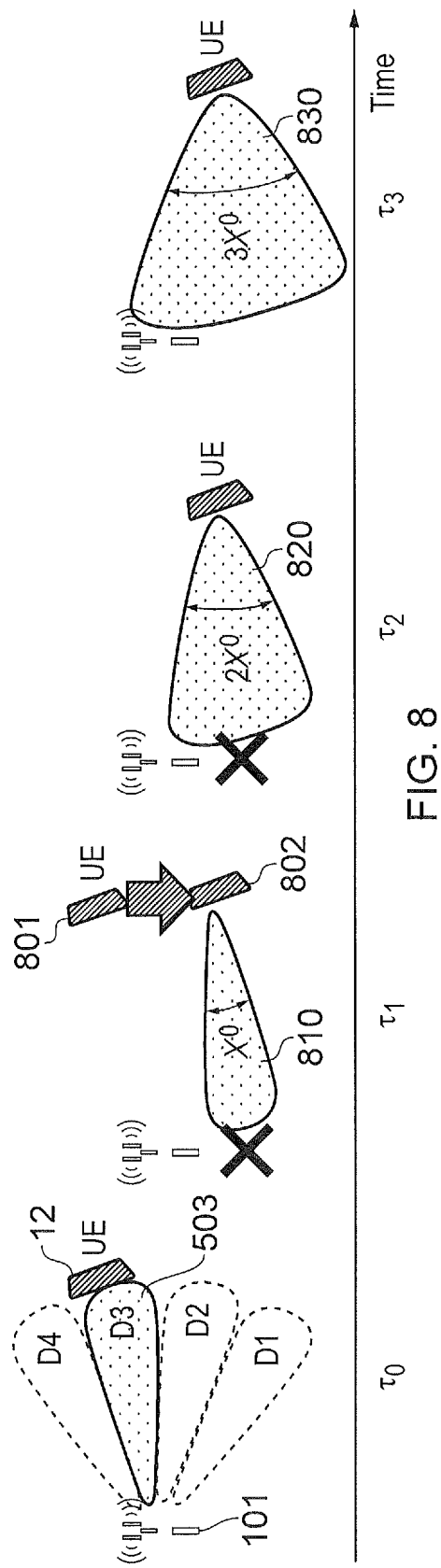
FIG. 8 illustrates an example of beam ramping in accordance with embodiments of the present technique.

In some embodiments of the present technique, the change in beam width is an increase in beam width when the number of PRACH transmission attempts increases. An example of this is shown in FIG. 8, where at time $\tau_0$, the UE 12 receives a common control channel in beam D3 503 and determines that this is the strongest (e.g. highest SNR) beam. At time $\tau_1$, the UE 12 transmits a PRACH using an uplink beam direction that is reciprocal to that of the downlink beam D3 with a beam width of X° 810. Here, however, the UE 12 has moved from position 801 to 802 (or alternatively the radio conditions have changed) and the reciprocal uplink beam 810 no longer points to the gNB 101, which consequently fails to detect the PRACH.

When no feedback is detected at the UE 12, the UE 12 would perform a second PRACH transmission attempt 820. In the second PRACH attempt, the beam width is increased to 2×X° at time $\tau_2$ but here the PRACH carried by this (wider) beam still fails to be detected by the gNB 101. At time $\tau_2$, the UE 12 performs a third PRACH transmission attempt 830 and again the beam width is increased to 3×X° where the gNB successfully detects the PRACH. In this example, the beam width is increased in a linear manner. It should be appreciated other increments of beam width can be used (e.g. doubling of beam width at each increased attempt).

In some embodiments of the present technique, the second and later PRACH transmission attempts are made when no feedback is detected at the UE either for a specified period or time, or for a specified number of transmission attempts at a previous width of the beam (i.e. the beam width may be increased to 3×X° for the third transmission attempt 830 following a predetermined number of attempted transmissions at 2×X° for the second transmission attempt 820 with no feedback detected at the UE). In other words, in these embodiments of the present technique, a set of the predetermined conditions comprises the controller circuitry being configured in combination with the receiver circuitry to determine that a feedback signal has not been received from the one of the infrastructure equipment in response to the data transmission using the first of the beams within a predetermined period. Alternatively, a set of the predetermined conditions comprises the controller circuitry being configured in combination with the receiver circuitry to determine that a feedback signal has not been received from the one of the infrastructure equipment in response to the data transmission using the first of the beams within a predetermined number of transmissions of the data using the first of the beams having a same beam width.

In some embodiments of the present technique, a maximum beam width is imposed on the UE. That is the UE will increase its beam width at each PRACH attempt until this maximum width is reached in which subsequent attempts do not increase the beam width but use this maximum beam width. In other words, in these embodiments, a set of the predetermined conditions comprises the controller circuitry being configured in combination with the transmitter circuitry to determine that the beam width is smaller than a maximum beam width. This maximum beam width may be signalled to the UE by the infrastructure equipment/gNB.

In some embodiments of the present technique, the PRACH transmission power is increased when the beam width is increased. In other words, in these embodiments, the controller circuitry is configured in combination with the transmitter circuitry, when changing the beam width of the first of the beams, to increase a transmission power of the data transmission using the first of the beams. In an example of these embodiments, the increase in power is proportional to the increase in beam width, i.e., if the beam width is doubled, the power is also doubled. This recognises that when the beam width increases, the power is spread over a larger area and it would have lower coverage and hence the power also needs to be increased accordingly. The amount by which the transmission power should be increased when the beam with is changed may be signalled to the UE by the infrastructure equipment/gNB.

In the prior art, the concept of power ramping of PRACH is known (where each subsequent PRACH preamble attempt is transmitted at a higher power). The starting power of the PRACH transmission process can be determined, for example, using an open loop power control procedure (where the UE measures the received power from the gNB and an indication of the transmit power from the gNB; the UE is then able to determine the path loss between the gNB and the UE). If the starting power of the PRACH transmission process is $P_{start}$ and the PRACH power ramping step in $\Delta P_{power\_ramp}$, then the power of the nth PRACH transmission is:

$$P_{PRACH}=P_{start}+n\times\Delta P_{power\_ramp}. \quad (1)$$

In the embodiments discussed above, relating to the increase in PRACH transmission power along with the increase in beam width, the starting power of the PRACH preamble transmission process changes as a function of the beam ramp. If the starting power of the PRACH transmission process on the initial narrow beam is $P_{start}$, the PRACH power ramping step is $\Delta P_{power\_ramp}$, and the starting power step between beam ramps is $\Delta P_{beam\_ramp}$, then the transmission power at the mth beam ramp and the nth power ramp (during that beam ramp) is:

$$P_{PRACH}=P_{start}+(m\times\Delta P_{beam\_ramp})+n\times\Delta P_{power\_ramp} \quad (2)$$

It will be appreciated that in the above described embodiments, the order of the power ramping procedures may be interchangeable. The above description has described that power ramping is performed initially and then beam ramping is performed (i.e. the UE increases the index 'n' before the index 'm'). However, it is also possible that beam ramping is performed first, followed by power ramping (i.e. the UE increases the index 'm' before the index 'n').

In some embodiments of the present technique, repetition is applied on the PRACH transmission. In other words, wherein the controller circuitry is configured in combination with the transmitter circuitry to repeat the transmission of the data, using the first of the beams having the changed beam width, one or more times. In some embodiments, the number of repetitions increases when the beam width is increased. In other words, the number of re-transmissions of the data using the first of the beams is proportional to a number of times the beam width has been increased. In some embodiments, the number of re-transmissions of the data using the first of the beams is proportional to the ratio of the width of the wider re-transmitted beam to the width of the original beam. In other words, the number of re-transmissions of the data using the first of the beams is proportional to a ratio of the changed beam width to the original beam width. This recognises that repetition would allow the accumulation of signal power at the gNB, i.e. repetition is used to compensate for the loss in coverage due to the expansion of the beam width. The number of re-transmissions which should be attempted by the UE for each beam width before changing the beam width may be signalled to the UE by the infrastructure equipment/gNB.

The repetition can be done in time or frequency. In other words, as an alternative to repeating the transmission one or more times, the controller circuitry is configured in combination with the transmitter circuitry to repeat the transmission of the data using the first of the beams having the changed beam width over one or more alternate sets of frequency resources. Repetition in frequency is used when the UE is not power limited and can benefit from frequency diversity. Repetition in time is useful when the UE reaches its maximum transmission power. Frequency hopping where the repetition is done in time and in different frequency can also be performed in subsequent attempts. Using the example in FIG. 8, at time $\tau_1$, i.e. first PRACH attempt 810, the UE 12 transmits the PRACH once. In the second attempt 820 at time $\tau_2$, the UE 12 perform 2×repetitions and in the third attempt 830 at time $\tau_3$, the UE 12 performs 3×repetitions on the PRACH. In this example, if frequency hopping were applied at the second attempt 820, the first repetition would be transmitted at a frequency $f_1$ and the second repetition would be transmitted at a frequency $f_2$.

Embodiments of the present technique are related to a technique of beam sweeping being used by the UE. In such a technique, the angle swept is increased when the PRACH attempt number increases. In other words, embodiments of the present technique are related to a communications device for transmitting data to or receiving data from a wireless communications network. The communications device comprises transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data. The controller circuitry being configured in combination with the receiver circuitry and the transmitter circuitry to form a plurality of beams which can be used by the transmitter circuitry to transmit data to one or more of the infrastructure equipment, each of the beams being offset from one another, to transmit, using a first of the beams, data to one of the infrastructure equipment, and to re-transmit using at least one next beam, dependent on one or more sets of predetermined conditions being met, the data to the one of the infrastructure equipment.

Figure 9:
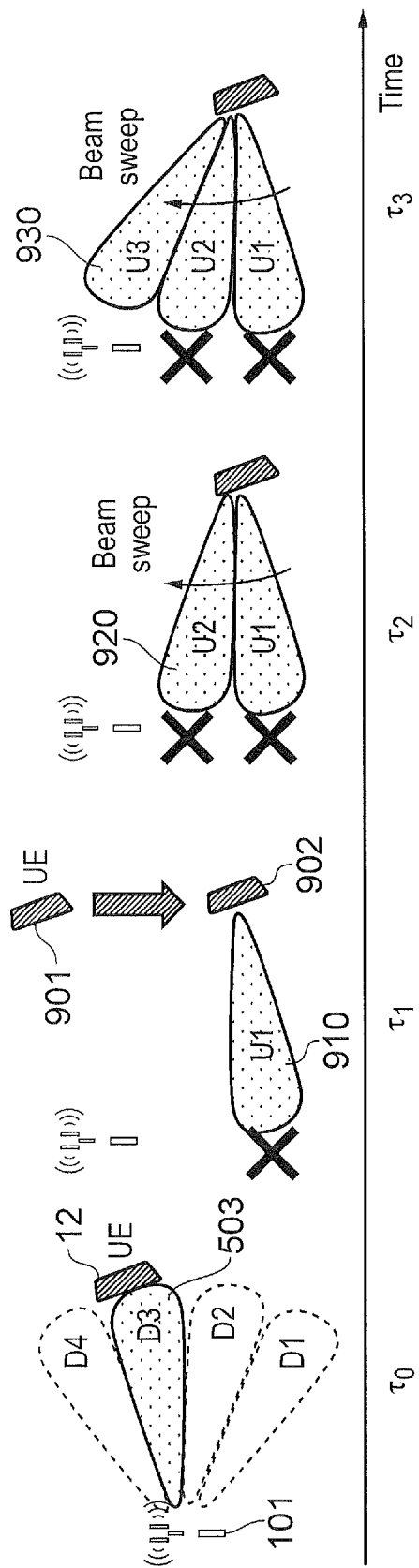
FIG. 9 illustrates an example of beam sweeping in each PRACH transmission attempt in accordance with embodiments of the present technique.

An example of such embodiments is shown in FIG. 9, where once again, the UE 12 uses uplink beam U1 910 which is the reciprocal of downlink beam D3 503 to transmit the first PRACH beam to the gNB 101 in the uplink in time $\tau_1$. Failing the first attempt, due to having moved from position 901 to position 902, the UE 12 performs the second PRACH attempt in time $\tau_2$, where the UE sweeps the beam by transmitting beam U1 910 followed by beam U2 920 in time such that the angle covered by these beams is a predetermined number of times larger than that of the beam in the first attempt. Here the second PRACH attempt also fails, and the UE 12 performs a third PRACH attempt in time $\tau_3$, where the beam is swept using beam U1 910, U2 920 and U3 930 in time, for a longer duration to cover an equivalent beam width that is larger than that in the second PRACH attempt. In this example, the gNB successfully detects the PRACH in the third attempt. In other words, the re-transmission of the data is carried out using the first and the next beams.

In some embodiments of the present technique, the UE performs a beam sweep to cover a larger beam width, similarly to the embodiments described in relation to FIG. 8. However, here it would exclude beams that have already failed. A beam is considered failed if it has been used unsuccessfully for M times where M is predefined. For example in FIG. 10, for the first PRACH attempt at time $\tau_1$, the UE 12 uses beam U1 1010, the reciprocal of beam D3 503, which fails to reach the gNB 101 due to the UE 12 having moved from position 1001 to position 1002. In the second attempt at time $\tau_2$, the UE sweeps the beam to cover a larger area, but this time it would exclude the beam U1 1010 (i.e. here M=1). Here, the UE 12 forms its larger beam coverage with beam U2 1020 and U3 1030 where beam U3 1030 reaches the gNB 101. In other words, in these embodiments, the re-transmission of the data is carried out using an incremental number of the next beams which have not already been used to transmit the data to the one of the infrastructure equipment.

In these embodiments relating to beam sweeping, each of the beams has a different angular bias with respect to a location of the communications device. Alternatively, in some embodiments of the present technique, the sweeping of the beam as described in relation to the previously discussed embodiments can occupy different frequency resources. For example, referring to FIG. 9 again, the beam U1 910 may occupy frequency f1, beam U2 920 may occupy frequency f2 and beam U3 930 may occupy frequency f3, where f1, f2 and f3 are different frequency resources. This provides frequency diversity in the swept beams. In other words, each of the beams occupies different frequency resources.

In some embodiments of the present technique, when the UE uses a wider beam, it also changes its beam direction in a predefined manner. In other words, the controller circuitry is configured in combination with the transmitter circuitry, when changing the beam width of the first of the beams, to change an angle of the first of the beams with respect to the communications device. For example in FIG. 11, the UE 12 transmits a PRACH using an uplink beam 1110 with beam width X° that is a reciprocal of a downlink beam D3 503 at time $\tau_1$, where the gNB 101 fails to detect the PRACH, due to the UE 12 having moved from position 1101 to position 1102. In the second PRACH attempt 1120, the UE 12 increases its beam width to 2X° but also changes the direction of the beam by Y° and this enables the beam to reach the gNB 101. These embodiments have the advantage of not requiring the re-transmission of energy in a direction in which it is known that the UE cannot communicate with the gNB; it is known that the direction of transmission used at $\tau_1$ was not the correct direction of transmission, even with a wide beam, and hence the retransmission does not transmit significant, wasted, energy in that direction.

In some embodiments of the present technique, the PRACH preamble sequence that the UE uses changes depending on the width of the beam that the UE uses. In other words, the controller circuitry is configured in combination with the transmitter circuitry, when changing the beam width of the first of the beams, to change a preamble sequence which is included within the data. In some embodiments, the preamble sequence may form the entirety of the data, or alternatively the preamble sequence may be a portion of the data. For example, referring to FIG. 8, at time $\tau_1$, the UE uses PREAMBLE_1, at time $\tau_2$, the UE uses PREAMBLE_2 etc. This allows the gNB to determine the width of the beam that the UE used for the PRACH preamble transmission. This then allows the gNB to determine a suitable beam width to use for the downlink transmission to the UE (e.g. for the case that the UE has moved). It also allows the gNB to allocate the UE with a suitable transport format for a subsequent uplink transmission (e.g. the format for the Message4 portion of the PRACH process), noting that wider beam transmissions will be received with a lower power spectral density by the gNB and hence will require a more robust transport format, e.g. a lower modulation and coding scheme.

In some embodiments of the present technique, the starting beam width used by the UE in the first attempt is a function of the path loss (or distance) from the gNB, or the UE power headroom. If the UE is close to the gNB and has high power headroom, i.e. is not limited in power, then it can afford to use a wider beam width to cover area and distance.

In some embodiments of the present technique, the change in beam width may be a decrease in the beam width in each successive PRACH attempt. The UE would start with a wide beam width and slowly narrow it down to a smaller beam width. Scenarios in which such embodiments may be useful include for a UE that is close to a gNB, where it does not have limitation in its power. Here, the UE would also get a good estimate of the beam reciprocity from the gNB. A wider beam width at the beginig of PRACH attempts would reduce the chances of having to perform multiple PRACH attempts, thus saving power in the long run.

Figure 12:
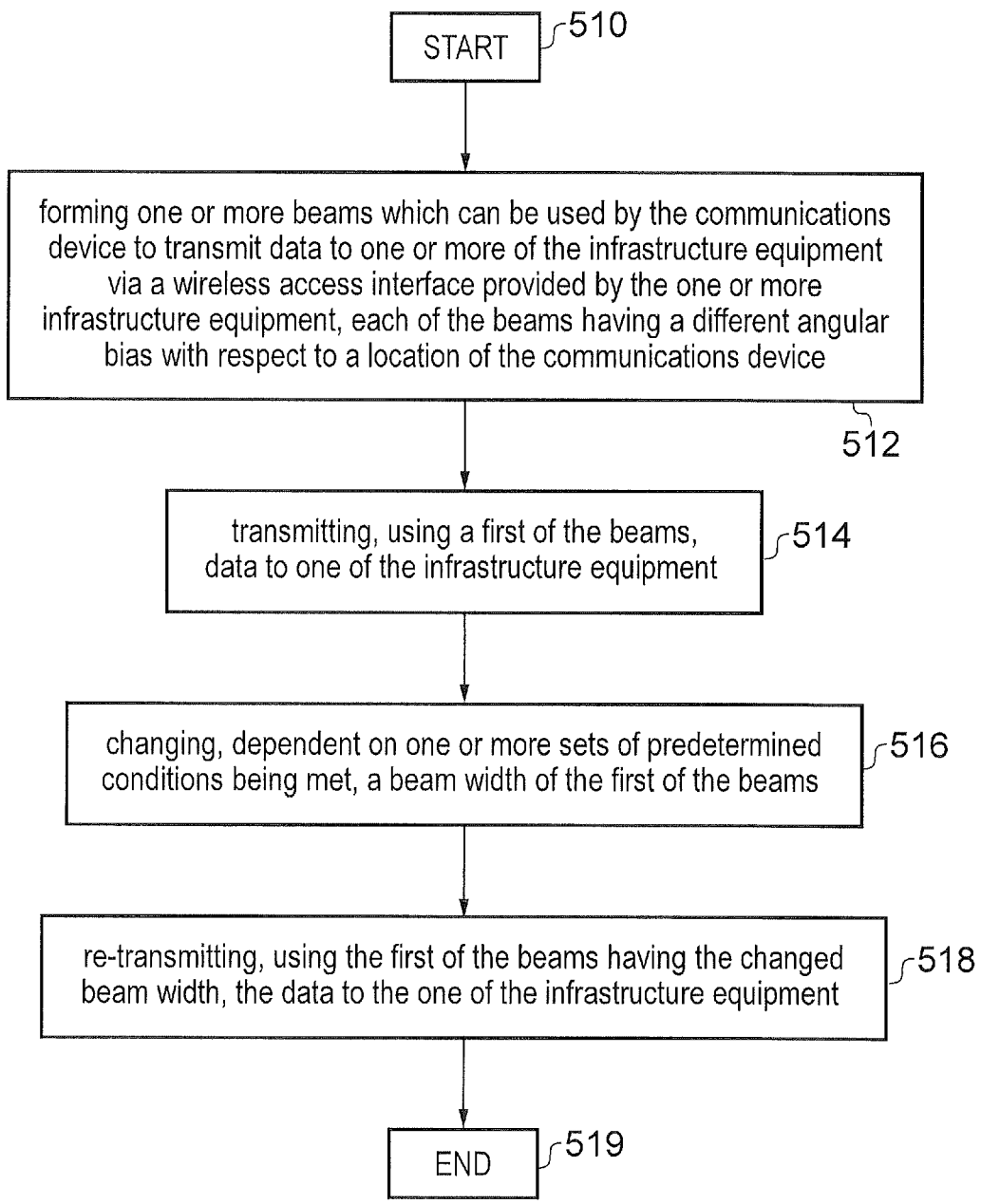
FIG. 12 shows a flow diagram illustrating a first process of communications between a communications device and an infrastructure equipment in accordance with embodiments of the present technique.

FIG. 12 shows a flow diagram illustrating a first process of communications between a communications device and an infrastructure equipment in accordance with embodiments of the present technique. The method, which is a method of controlling the communications device, begins in step S10. The method comprises, in step S12, forming one or more beams which can be used by the communications device to transmit data to one or more of the infrastructure equipment via a wireless access interface provided by the one or more infrastructure equipment, each of the beams having a different angular bias with respect to a location of the communications device. The method then comprises, in step S14, transmitting, using a first of the beams, data to one of the infrastructure equipment. In step S16, the process comprises changing, dependent on one or more sets of predetermined conditions being met, a beam width of the first of the beams. The method then advances to step S18, which comprises re-transmitting, using the first of the beams having the changed beam width, the data to the one of the infrastructure equipment. The process ends in step S19.

Figure 13:
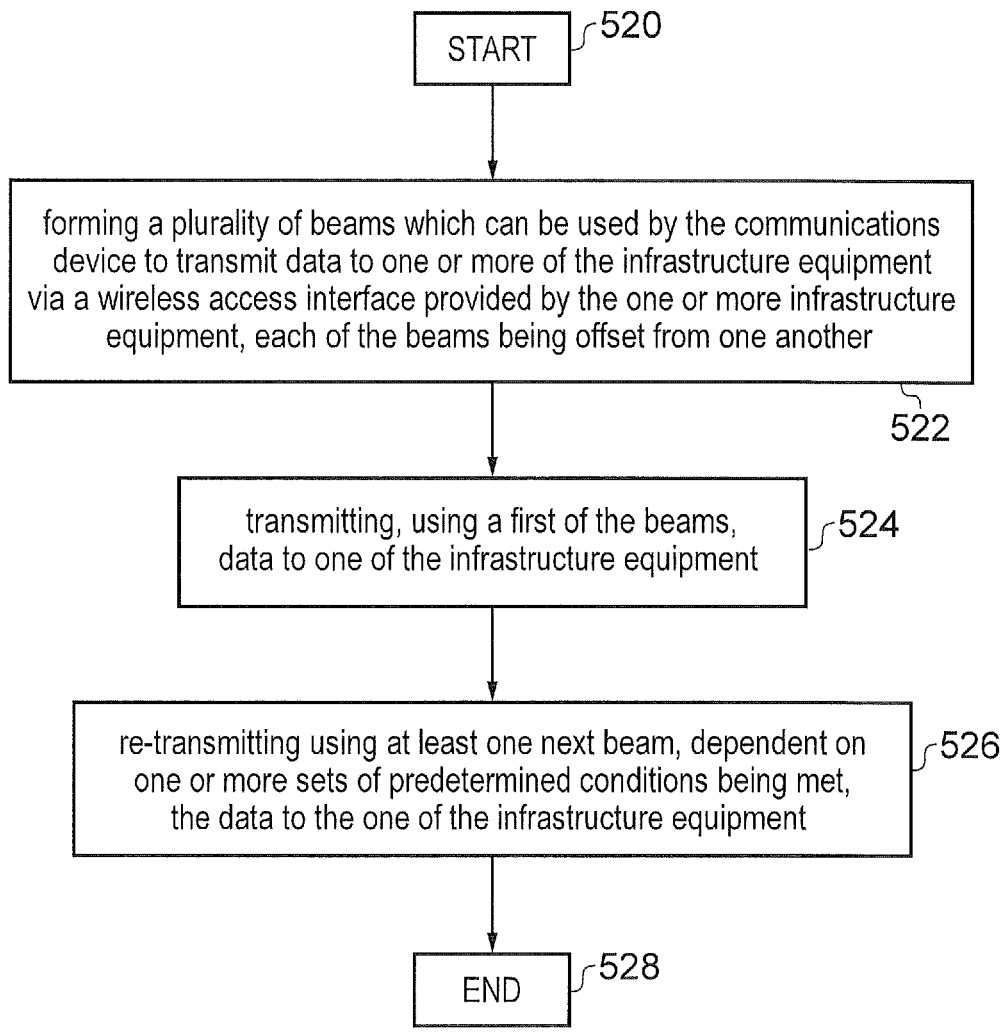
FIG. 13 shows a flow diagram illustrating a second process of communications between a communications device and an infrastructure equipment in accordance with embodiments of the present technique.

FIG. 13 shows a flow diagram illustrating a second process of communications between a communications device and an infrastructure equipment in accordance with embodiments of the present technique. The method, which is a method of controlling the communications device, begins in step S20. The method comprises, in step S22, forming a plurality of beams which can be used by the communications device to transmit data to one or more of the infrastructure equipment via a wireless access interface provided by the one or more infrastructure equipment, each of the beams being offset from one another. The method then comprises in step S24, transmitting, using a first of the beams, data to one of the infrastructure equipment. In step S26, the process comprises re-transmitting using at least one next beam, dependent on one or more sets of predetermined conditions being met, the data to the one of the infrastructure equipment. The process ends in step S28.

Embodiments of the present technique are described in relation to PRACH transmissions, but it would be appreciated by persons skilled in the art that they would be equally applicable for transmissions that are similar to PRACH. For example, such transmissions may include grant free transmission where the uplink transmission is not scheduled by the gNB.

It should be further appreciated by those skilled in the art that the above described embodiments of the present technique may be combined. By way of a non-limiting example, repetition can be used together with beam sweeping in different PRACH attempts. Or in one attempt, repetition may be used whilst in another subsequent attempt of the same transmission, beam sweeping may be used.

Although the above described embodiments of the present technique deal primarily with the uplink transmissions from a communications device or UE to an infrastructure equipment or gNB of a mobile communications network, it should be clear to those reading that, although power saving is less of a concern on the network side, embodiments of the present technique may also include the transmission of signals on the downlink from an infrastructure equipment or gNB of a mobile communications network to a communications device or UE. In other words, such embodiments of the present technique provide an infrastructure equipment forming part of a wireless communications network, the infrastructure equipment comprising transmitter circuitry configured to transmit signals to one or more communications devices via a wireless access interface provided by the wireless communications network, receiver circuitry configured to receive signals from the one or more communications devices via the wireless access interface, and controller circuitry configured to control the transmitter circuitry and the receiver circuitry to transmit or to receive the signals representing data. In a first arrangement of these embodiments, the controller circuitry is configured in combination with the receiver circuitry and the transmitter circuitry to form one or more beams which can be used by the transmitter circuity to transmit data to one or more of the communications devices, each of the beams having a different angular bias with respect to a location of the infrastructure equipment, to transmit the signals, using a first of the beams, to one of the communications devices, to change, dependent on one or more sets of predetermined conditions being met, a beam width of the first of the beams, and to re-transmit, using the first of the beams having the changed beam width, the signals to the one of the communications devices. In a second arrangement of these embodiments, the controller circuitry is configured in combination with the receiver circuitry and the transmitter circuitry to form a plurality of beams which can be used by the transmitter circuity to transmit data to one or more of the communications devices, each of the beams being offset from one another, to transmit, using a first of the beams, data to one of the communications devices, and to re-transmit using at least one next beam, dependent on one or more sets of predetermined conditions being met, the data to the one of the communications devices.

Embodiments of the present technique may also include the transmission of signals on a sidelink: i.e. between one communication device and another communication device.

Advantages of embodiments of the present technique include that the probability of signal detection at a gNB may be increased whilst saving transmission power at a UE. Beam forming allows for longer distance transmissions to be made by the UE without increasing transmission power proportionally. Embodiments of the present technique provide various ways and techniques in which beam forming can be exploited by the UE to maximise the chance of the gNB successfully receiving its transmissions, whilst keeping power consumption low.

The following numbered paragraphs provide further example aspects and features of the present technique:

Paragraph 1. A communications device for transmitting data to or receiving data from a wireless communications network, the communications device comprising transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data, the controller circuitry being configured in combination with the receiver circuitry and the transmitter circuitry to form one or more beams which can be used by the transmitter circuity to transmit data to one or more of the infrastructure equipment, each of the beams having a different angular bias with respect to a location of the communications device, to transmit the signals, using a first of the beams, to one of the infrastructure equipment, to change, dependent on one or more sets of predetermined conditions being met, a beam width of the first of the beams, and to re-transmit, using the first of the beams having the changed beam width, the signals to the one of the infrastructure equipment.

Paragraph 2. A communications device according to Paragraph 1, wherein a first set of the predetermined conditions comprises the controller circuitry being configured in combination with the receiver circuitry to determine that a feedback signal has not been received from the one of the infrastructure equipment in response to the data transmission using the first of the beams within a predetermined period.

Paragraph 3. A communications device according to Paragraph 1 or Paragraph 2, wherein the changing of the beam width comprises increasing the beam width.

Paragraph 4. A communications device according to Paragraph 3, wherein a second set of the predetermined conditions comprises the controller circuitry being configured in combination with the transmitter circuitry to determine that the beam width is smaller than a maximum beam width.

Paragraph 5. A communications device according to any of Paragraphs 1 to 4, wherein a third set of the predetermined conditions comprises the controller circuitry being configured in combination with the receiver circuitry to determine that a feedback signal has not been received from the one of the infrastructure equipment in response to the data transmission using the first of the beams within a predetermined number of transmissions of the data using the first of the beams having a same beam width.

Paragraph 6. A communications device according to any of Paragraphs 3, 4 or 5, wherein the controller circuitry is configured in combination with the transmitter circuitry, when changing the beam width of the first of the beams, to increase a transmission power of the data transmission using the first of the beams.

Paragraph 7. A communications device according to Paragraph 6, wherein the increase of the transmission power is proportional to the increase of the beam width.

Paragraph 8. A communications device according to any of Paragraphs 3 to 7, wherein the controller circuitry is configured in combination with the transmitter circuitry to repeat the re-transmission of the data, using the first of the beams having the changed beam width, one or more times.

Paragraph 9. A communications device according to Paragraph 8, wherein the number of re-transmissions of the data using the first of the beams is proportional to a number of times the beam width has been increased.

Paragraph 10. A communications device according to Paragraph 8, wherein the number of re-transmissions of the data using the first of the beams is proportional to a ratio of the changed beam width to the original beam width.

Paragraph 11. A communications device according to any of Paragraphs 3 to 7, wherein the controller circuitry is configured in combination with the transmitter circuitry to repeat the re-transmission of the data using the first of the beams having the changed beam width over one or more alternate sets of frequency resources.

Paragraph 12. A communications device according to any of Paragraphs 3 to 11, wherein the controller circuitry is configured in combination with the transmitter circuitry, when changing the beam width of the first of the beams, to change an angle of the first of the beams with respect to the communications device.

Paragraph 13. A communications device according to any of Paragraphs 3 to 12, wherein the controller circuitry is configured in combination with the transmitter circuitry, when changing the beam width of the first of the beams, to change a preamble sequence which is included within the data.

Paragraph 14. A communications device according to Paragraph 1 or Paragraph 2, wherein the changing of the beam width comprises decreasing the beam width.

Paragraph 15. A communications device for transmitting data to or receiving data from a wireless communications network, the communications device comprising transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data, the controller circuitry being configured in combination with the receiver circuitry and the transmitter circuitry to form a plurality of beams which can be used by the transmitter circuity to transmit data to one or more of the infrastructure equipment, each of the beams being offset from one another, to transmit, using a first of the beams, data to one of the infrastructure equipment, and to re-transmit using at least one next beam, dependent on one or more sets of predetermined conditions being met, the data to the one of the infrastructure equipment.

Paragraph 16. A communications device according to Paragraph 15, wherein the re-transmission of the data is carried out using the first and the next beams.

Paragraph 17. A communications device according to Paragraph 15, wherein the re-transmission of the data is carried out using an incremental number of the next beams which have not already been used to transmit the data to the one of the infrastructure equipment.

Paragraph 18. A communications device according to any of Paragraphs 15 to 17, wherein each of the beams has a different angular bias with respect to a location of the communications device.

Paragraph 19. A communications device according to any of Paragraphs 15 to 17, wherein each of the beams occupies different frequency resources.

Paragraph 20. A method of controlling a communications device for transmitting data to or receiving data from a wireless communications network, the method comprising forming one or more beams which can be used by the communications device to transmit data to one or more of the infrastructure equipment via a wireless access interface provided by the one or more infrastructure equipment, each of the beams having a different angular bias with respect to a location of the communications device, transmitting, using a first of the beams, data to one of the infrastructure equipment, changing, dependent on one or more sets of predetermined conditions being met, a beam width of the first of the beams, and re-transmitting, using the first of the beams having the changed beam width, the data to the one of the infrastructure equipment.

Paragraph 21. A method of controlling a communications device for transmitting data to or receiving data from a wireless communications network, the method comprising forming a plurality of beams which can be used by the communications device to transmit data to one or more of the infrastructure equipment via a wireless access interface provided by the one or more infrastructure equipment, each of the beams being offset from one another, transmitting, using a first of the beams, data to one of the infrastructure equipment, and re-transmitting using at least one next beam, dependent on one or more sets of predetermined conditions being met, the data to the one of the infrastructure equipment.

Paragraph 22. Circuitry for a communications device for transmitting data to or receiving data from a wireless communications network, the communications device comprising transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data, the controller circuitry being configured in combination with the receiver circuitry and the transmitter circuitry to form one or more beams which can be used by the transmitter circuity to transmit data to one or more of the infrastructure equipment, each of the beams having a different angular bias with respect to a location of the communications device, to transmit, using a first of the beams, data to one of the infrastructure equipment, to change, dependent on one or more sets of predetermined conditions being met, a beam width of the first of the beams, and to re-transmit, using the first of the beams having the changed beam width, the data to the one of the infrastructure equipment.

Paragraph 23. Circuitry for a communications device for transmitting data to or receiving data from a wireless communications network, the communications device comprising transmitter circuitry configured to transmit signals to one or more infrastructure equipment of the wireless communications network via a wireless access interface provided by the one or more infrastructure equipment, receiver circuitry configured to receive signals from the one or more infrastructure equipment via the wireless access interface, and controller circuitry configured to control the transmitter circuitry and the receiver circuitry to transmit or to receive the signals representing data, the controller circuitry being configured in combination with the receiver circuitry and the transmitter circuitry to form a plurality of beams which can be used by the transmitter circuity to transmit data to one or more of the infrastructure equipment, each of the beams being offset from one another, to transmit, using a first of the beams, data to one of the infrastructure equipment, and to re-transmit using at least one next beam, dependent on one or more sets of predetermined conditions being met, the data to the one of the infrastructure equipment.

Paragraph 24. An infrastructure equipment forming part of a wireless communications network, the infrastructure equipment comprising transmitter circuitry configured to transmit signals to one or more communications devices via a wireless access interface provided by the wireless communications network, receiver circuitry configured to receive signals from the one or more communications devices via the wireless access interface, and controller circuitry configured to control the transmitter circuitry and the receiver circuitry to transmit or to receive the signals representing data, the controller circuitry being configured in combination with the receiver circuitry and the transmitter circuitry to form one or more beams which can be used by the transmitter circuity to transmit data to one or more of the communications devices, each of the beams having a different angular bias with respect to a location of the infrastructure equipment, to transmit the signals, using a first of the beams, to one of the communications devices, to change, dependent on one or more sets of predetermined conditions being met, a beam width of the first of the beams, and to re-transmit, using the first of the beams having the changed beam width, the signals to the one of the communications devices.

Paragraph 25. An infrastructure equipment forming part of a wireless communications network, the infrastructure equipment comprising transmitter circuitry configured to transmit signals to one or more communications devices via a wireless access interface provided by the wireless communications network, receiver circuitry configured to receive signals from the one or more communications devices via the wireless access interface, and controller circuitry configured to control the transmitter circuitry and the receiver circuitry to transmit or to receive the signals representing data, the controller circuitry being configured in combination with the receiver circuitry and the transmitter circuitry to form a plurality of beams which can be used by the transmitter circuity to transmit data to one or more of the communications devices, each of the beams being offset from one another, to transmit, using a first of the beams, data to one of the communications devices, and to re-transmit using at least one next beam, dependent on one or more sets of predetermined conditions being met, the data to the one of the communications devices.

Paragraph 26. A method of controlling an infrastructure equipment forming part of a wireless communications network, the method comprising
- forming one or more beams which can be used by the infrastructure equipment to transmit data to one or more communications devices via a wireless access interface provided by the wireless communications network, each of the beams having a different angular bias with respect to a location of the infrastructure equipment,
- transmitting, using a first of the beams, data to one of the communications devices,
- changing, dependent on one or more sets of predetermined conditions being met, a beam width of the first of the beams, and
- re-transmitting, using the first of the beams having the changed beam width, the data to the one of the communications devices.

Paragraph 27. A method of controlling an infrastructure equipment forming part of a wireless communications network, the method comprising
- forming a plurality of beams which can be used by the infrastructure equipment to transmit data to one or more of the communications devices via a wireless access interface provided by the wireless communications network, each of the beams being offset from one another,
- transmitting, using a first of the beams, data to one of the communications devices, and
- re-transmitting using at least one next beam, dependent on one or more sets of predetermined conditions being met, the data to the one of the communications devices.

Paragraph 28. An infrastructure equipment forming part of a wireless communications network, the infrastructure equipment comprising
- transmitter circuitry configured to transmit signals to one or more communications devices via a wireless access interface provided by the wireless communications network,
- receiver circuitry configured to receive signals from the one or more communications devices via the wireless access interface, and
- controller circuitry configured to control the transmitter circuitry and the receiver circuitry to transmit or to receive the signals representing data, the controller circuitry being configured in combination with the receiver circuitry
- to receive a re-transmission of signals from one of the communications devices, the signals having been transmitted by the one of the communications devices on a first beam of one or more beams formed by the one of the communications devices, each of the beams having a different angular bias with respect to a location of the communications device, wherein dependent on one or more sets of predetermined conditions being met, a beam width of the first of the beams is changed by the one of the communications devices, wherein the re-transmission received by the infrastructure equipment has been transmitted by the one of the communications devices using the first of the beams having the changed beam width.

Paragraph 29. An infrastructure equipment according to Paragraph 28, wherein the controller is configured in combination with the transmitter circuitry
- to transmit a signalling message to the one of the communications devices, the signalling message comprising an indication of a number of re-transmissions which should be attempted by the one of the communications devices for each beam width of the first of the beams before changing the beam width of the first of the beams.

Paragraph 30. An infrastructure equipment according to Paragraph 28 or Paragraph 29, wherein the controller is configured in combination with the transmitter circuitry
- to transmit a signalling message to the one of the communications devices, the signalling message comprising an indication of a maximum beam width to which the communications device may change the beam width of the first of the beams.

Paragraph 31. An infrastructure equipment according to any of Paragraphs 28 to 30, wherein the controller is configured in combination with the transmitter circuitry
- to transmit a signalling message to the one of the communications devices, the signalling message comprising an indication of an amount by which the communications device should increase, when changing the beam width of the first of the beams, to increase a transmission power of the data transmission using the first of the beams.

Paragraph 32. A method of controlling an infrastructure equipment forming part of a wireless communications network, the method comprising
- receiving, at the infrastructure equipment, a re-transmission of signals from one of the communications devices, the signals having been transmitted by the one of the communications devices on a first beam of one or more beams formed by the one of the communications devices, each of the beams having a different angular bias with respect to a location of the communications device, wherein dependent on one or more sets of predetermined conditions being met, a beam width of the first of the beams is changed by the one of the communications devices, wherein the re-transmission received by the infrastructure equipment has been transmitted by the one of the communications devices using the first of the beams having the changed beam width, Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] R1-1612031, "Multi-beam RACH design and evaluation," Qualcomm Inc., RAN1 #87.
[2] R1-1612462, "Preamble design aspects for NR RACH without beam correspondence," Samsung, RAN1 #87.
[3] RP-151621, "New Work Item: NarrowBand IOT NB-IOT," Qualcomm, RAN #69.
[4] RP-160671, "New SID Proposal: Study on New Radio Access Technology," NTT DOCOMO, RAN #71.
[5] LTE for UMTS: OFDMA and SC-FDMA Based Radio Access, Harris Holma and Antti Toskala, Wiley 2009, ISBN 978-0-470-99401-6.
[6] R1-165364, "Support for Beam Based Common Control Plane", Nokia, Alcatel-Lucent Shanghai Bell, RAN1 #85.

What is claimed is:

1. A communications device for transmitting data to or receiving data from a wireless communications network, the communications device comprising
    transmitter circuitry configured to transmit signals to one or more infrastructure equipment of the wireless communications network via a wireless access interface provided by the one or more infrastructure equipment,
    receiver circuitry configured to receive signals from the one or more infrastructure equipment via the wireless access interface, and
    controller circuitry configured to control the transmitter circuitry and the receiver circuitry to transmit or to receive the signals representing data, the controller circuitry being configured in combination with the receiver circuitry and the transmitter circuitry
    to form one or more beams which can be used by the transmitter circuitry to transmit data to one or more of the infrastructure equipment, each of the beams having a different angular bias with respect to a location of the communications device,
    to transmit the signals, using a first of the beams, to one of the infrastructure equipment,
    to change, dependent on one or more sets of predetermined conditions being met, a beam width of the first of the beams, wherein the beam width increases relative to each previous beam width as a number of Physical Random Access Channel (PRACH) transmission attempts increases, and
    to re-transmit, using the first of the beams having the changed beam width, the signals to the one of the infrastructure equipment.

2. The communications device according to claim 1, wherein a first set of the predetermined conditions comprises the controller circuitry being configured in combination with the receiver circuitry to determine that a feedback signal has not been received from the one of the infrastructure equipment in response to the data transmission using the first of the beams within a predetermined period.

3. The communications device according to claim 1, wherein the changing of the beam width comprises increasing the beam width.

4. The communications device according to claim 3, wherein a second set of the predetermined conditions comprises the controller circuitry being configured in combination with the transmitter circuitry to determine that the beam width is smaller than a maximum beam width.

5. The communications device according to claim 1, wherein a third set of the predetermined conditions comprises the controller circuitry being configured in combination with the receiver circuitry to determine that a feedback signal has not been received from the one of the infrastructure equipment in response to the data transmission using the first of the beams within a predetermined number of transmissions of the data using the first of the beams having a same beam width.

6. The communications device according to claim 3, wherein the controller circuitry is configured in combination with the transmitter circuitry, when changing the beam width of the first of the beams, to increase a transmission power of the data transmission using the first of the beams.

7. The communications device according to claim 6, wherein the increase of the transmission power is proportional to the increase of the beam width.

8. The communications device according to claim 3, wherein the controller circuitry is configured in combination with the transmitter circuitry to repeat the re-transmission of the data, using the first of the beams having the changed beam width, one or more times.

9. The communications device according to claim 8, wherein the number of re-transmissions of the data using the first of the beams is proportional to a number of times the beam width has been increased.

10. The communications device according to claim 8, wherein the number of re-transmissions of the data using the first of the beams is proportional to a ratio of the changed beam width to the original beam width.

11. The communications device according to claim 3, wherein the controller circuitry is configured in combination with the transmitter circuitry to repeat the re-transmission of the data using the first of the beams having the changed beam width over one or more alternate sets of frequency resources.

12. The communications device according to claim 3, wherein the controller circuitry is configured in combination with the transmitter circuitry, when changing the beam width of the first of the beams, to change an angle of the first of the beams with respect to the communications device.

13. The communications device according to claim 3, wherein the controller circuitry is configured in combination with the transmitter circuitry, when changing the beam width of the first of the beams, to change a preamble sequence which is included within the data.

14. The communications device according to claim 1, wherein the changing of the beam width comprises decreasing the beam width.

15. A communications device for transmitting data to or receiving data from a wireless communications network, the communications device comprising
    transmitter circuitry configured to transmit signals to one or more infrastructure equipment of the wireless communications network via a wireless access interface provided by the one or more infrastructure equipment,
    receiver circuitry configured to receive signals from the one or more infrastructure equipment via the wireless access interface, and controller circuitry configured to control the transmitter circuitry and the receiver circuitry to transmit or to receive the signals representing data, the controller circuitry being configured in combination with the receiver circuitry and the transmitter circuitry to form a plurality of beams which can be used by the transmitter circuitry to transmit data to one or more of the infrastructure equipment, each of the beams being offset from one another, to transmit, using a first of the beams, data to one of the infrastructure equipment, and to re-transmit using at least one next beam, dependent on one or more sets of predetermined conditions being met, the data to the one of the infrastructure equipment, wherein a beam width increases relative to each previous beam width as a number of Physical Random Access Channel (PRACH)transmission attempts increases.

16. The communications device according to claim 15, wherein the re-transmission of the data is carried out using the first and the next beams.

17. The communications device according to claim 15, wherein the re-transmission of the data is carried out using an incremental number of the next beams which have not already been used to transmit the data to the one of the infrastructure equipment.

18. The communications device according to claim 15, wherein each of the beams has a different angular bias with respect to a location of the communications device.

19. The communications device according to claim 15, wherein each of the beams occupies different frequency resources.

20. An infrastructure equipment forming part of a wireless communications network, the infrastructure equipment comprising transmitter circuitry configured to transmit signals to one or more communications devices via a wireless access interface provided by the wireless communications network, receiver circuitry configured to receive signals from the one or more communications devices via the wireless access interface, and controller circuitry configured to control the transmitter circuitry and the receiver circuitry to transmit or to receive the signals representing data, the controller circuitry being configured in combination with the receiver circuitry and the transmitter circuitry to form one or more beams which can be used by the transmitter circuitry to transmit data to one or more of the communications devices, each of the beams having a different angular bias with respect to a location of the infrastructure equipment, to transmit the signals, using a first of the beams, to one of the communications devices, to change, dependent on one or more sets of predetermined conditions being met, a beam width of the first of the beams, wherein the beam width increases relative to each previous beam width as a number of Physical Random Access Channel (PRACH) transmission attempts increases, and to re-transmit, using the first of the beams having the changed beam width, the signals to the one of the communications devices.

* * * * *